(12) United States Patent
Murata et al.

(10) Patent No.: US 11,299,062 B2
(45) Date of Patent: Apr. 12, 2022

(54) MOTOR DRIVE DEVICE

(71) Applicant: Mitsubishi Electric Corporation, Tokyo (JP)

(72) Inventors: Yasukazu Murata, Hyogo (JP); Keiichi Enoki, Tokyo (JP); Masutaka Watanabe, Tokyo (JP); Shingo Harada, Tokyo (JP); Yoshimasa Nishijima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 295 days.

(21) Appl. No.: 15/250,172

(22) Filed: Aug. 29, 2016

(65) Prior Publication Data

US 2017/0264229 A1 Sep. 14, 2017

(30) Foreign Application Priority Data

Mar. 10, 2016 (JP) .............................. JP2016-046804

(51) Int. Cl.
*B60L 58/12* (2019.01)
*H02P 25/22* (2006.01)
(Continued)

(52) U.S. Cl.
CPC ............... *B60L 58/12* (2019.02); *B60L 50/51* (2019.02); *B60W 10/08* (2013.01); *B60W 20/10* (2013.01);
(Continued)

(58) Field of Classification Search
CPC . H02M 1/32; H02M 7/521; H02P 9/48; H02P 9/14; H02P 27/08; B60W 10/08;
(Continued)

(56) References Cited

U.S. PATENT DOCUMENTS

2009/0261774 A1* 10/2009 Yuuki .................. H02K 1/2766
                                                    318/720
2012/0306417 A1* 12/2012 Schwarz ............... B60L 3/0023
                                                    318/400.26
(Continued)

FOREIGN PATENT DOCUMENTS

DE      10 2011 081 173 A1    2/2013
DE      11 2011 105 776 T5    8/2014
(Continued)

OTHER PUBLICATIONS

Communication dated Jan. 31, 2017 from the Japanese Patent Office in counterpart Japanese application No. 2016-046804.
(Continued)

*Primary Examiner* — Said Bouziane
(74) *Attorney, Agent, or Firm* — Sughrue Mion, PLLC

(57) ABSTRACT

MCU (2001) determines whether at least one of double three-phase inverter (2030) or battery (2002) has a failure, or battery (2002) is fully charged, and switches control to be performed in inverter (2030) between all-phase shut off and three-phase short circuit based on a motor rotation speed of double three-phase motor (2050) when MCU (2001) determines that any one of inverter (2030) and battery (2002) has a failure, or battery (2002) is fully charged. Battery (2002) and inverter (2030) can be protected when current is inhibited from flowing from motor (2050) to battery (2002) due to a failure of inverter (2030) or battery (2002).

2 Claims, 8 Drawing Sheets

(51) Int. Cl.
*H02P 3/22* (2006.01)
*H02P 29/032* (2016.01)
*B60L 50/51* (2019.01)
*H02P 29/024* (2016.01)
*B60W 10/08* (2006.01)
*B60W 20/10* (2016.01)
*H02P 27/08* (2006.01)
*H02H 7/122* (2006.01)
*H02H 7/08* (2006.01)

(52) U.S. Cl.
CPC .............. *H02P 3/22* (2013.01); *H02P 25/22* (2013.01); *H02P 27/08* (2013.01); *H02P 29/0241* (2016.02); *H02P 29/032* (2016.02); *B60L 2210/30* (2013.01); *B60L 2210/40* (2013.01); *H02H 7/0833* (2013.01); *H02H 7/1225* (2013.01); *Y02T 10/64* (2013.01); *Y02T 10/70* (2013.01); *Y02T 10/72* (2013.01); *Y10S 903/906* (2013.01)

(58) Field of Classification Search
CPC ... B60W 30/188; B60W 11/1861; B60K 6/20; H02H 7/00
See application file for complete search history.

(56) References Cited

U.S. PATENT DOCUMENTS

| | | | | |
|---|---|---|---|---|
| 2014/0156130 A1* | 6/2014 | Ogawa | ................... | B60L 3/04 701/22 |
| 2014/0191700 A1* | 7/2014 | Eberlein | ............... | B60L 3/0061 318/504 |
| 2015/0035500 A1* | 2/2015 | Jacob | ..................... | B60L 11/14 322/10 |
| 2015/0280624 A1* | 10/2015 | Sotome | ..................... | H02P 6/12 318/400.22 |
| 2016/0152128 A1* | 6/2016 | Minegishi | ............ | B60W 10/06 180/65.265 |
| 2016/0248317 A1* | 8/2016 | Taguchi | .................. | H02M 1/32 |
| 2017/0077843 A1* | 3/2017 | Grossmann | ........... | B60L 3/0061 |
| 2020/0353820 A1 | 11/2020 | Eriksson et al. | | |

FOREIGN PATENT DOCUMENTS

| | | |
|---|---|---|
| JP | 10-145904 A | 5/1998 |
| JP | 2010207053 A | 9/2010 |
| JP | 4675299 B2 | 4/2011 |
| JP | 2011172343 A | 9/2011 |
| JP | 2012050332 A | 3/2012 |
| JP | 2012-249397 A | 12/2012 |
| WO | 2012070106 A1 | 5/2012 |
| WO | 2016/076429 A1 | 5/2016 |

OTHER PUBLICATIONS

Communication dated Sep. 5, 2017, from the Japanese Patent Office in counterpart application No. 2016-046804.

Communication dated Jun. 14, 2021, issued by the German Patent and Trademark Office in application No. 10 2016 220 602.8.

* cited by examiner

MOTOR DRIVE DEVICE

BACKGROUND OF THE INVENTION

1. Field of the Invention

The present invention relates to a motor drive device, and more particularly, to a motor drive device configured to selectively switch between three-phase short circuit and all-phase shut off based on a motor rotation speed or an induced voltage of a motor.

2. Description of the Related Art

In recent years, attention has been paid on a hybrid vehicle and an electric vehicle as energy-saving and environmentally friendly vehicles. The hybrid vehicle uses a motor as well as a conventional engine as power sources, and the electric vehicle uses a motor as a power source. The hybrid vehicle and the electric vehicle are both configured so that DC electric power stored in a battery is converted into AC electric power by an inverter circuit to drive a motor and run the vehicle.

Further, the hybrid vehicle includes a motor-generator having a power generation function. The motor-generator is configured to generate power with the use of rotational energy that is generated when an engine is driven. Further, the motor-generator is configured to regenerate power with the use of rotational energy from tires in coasting operation. Electric power generated by the motor-generator in this way is stored in a battery.

In a related-art motor drive device mounted on a vehicle having the configuration as described above, a voltage of a charging path of a control circuit of the motor drive device rapidly increases when some kind of trouble occurs, such as that a motor is not driven and a battery fails in a power generation state, a connector connecting the motor drive device and the battery to each other comes off, or a circuit breaker or the like inserted between connectors is opened. As a result, a large overvoltage occurs due to the voltage increase, and this overvoltage is applied to circuit elements in the motor drive device, such as smoothing capacitors, or is applied to each device connected to the motor drive device as a load of a DC power supply, to thereby cause troubles such as degradation and damage of the circuit elements or each device.

In order to deal with this troubles, for example, in Japanese Patent No. 4675299, there is proposed a control device, including overvoltage determination means for determining an overvoltage of an output circuit of a rotating electric machine, and command value calculation means for transitioning, when the overvoltage determination means determines an overvoltage, power generation electric power command values and field current command values to zero. In the configuration described in Japanese Patent No. 4675299, when the overvoltage determination means determines an overvoltage, an electric power conversion device is controlled to cause the rotating electric machine to enter a phase short-circuit state so that short-circuit current may flow through the rotating electric machine, to thereby suppress the maximum value of overvoltage and quickly reduce overvoltage. Further, circuit elements used in the control device or loads of the rotating electric machine can be protected from degradation, damage, and the like that are caused due to overvoltage.

However, it is concerned that when the electric power conversion device is controlled to establish the phase short-circuit state after overvoltage is determined as in Japanese Patent No. 4675299 described above, time elapses in the overvoltage state, and hence the circuit elements used in the control device or the loads of the rotating electric machine cannot be protected from degradation, damage, and the like that are caused due to overvoltage during that time. Further, the overvoltage determination processing may be complicated and may lead to an increase in cost.

Further, systems in which an engine and a motor are directly coupled to each other by a drive shaft are configured to regenerate power with an induced voltage that is generated when the motor is rotated by the engine. However, current is inhibited from flowing to the power supply side in some cases because, for example, a power supply has a failure or a battery is fully charged.

SUMMARY OF THE INVENTION

The present invention has been made in order to solve the above-mentioned problems, and has an object to obtain a motor drive device configured to switch to three-phase short circuit or all-phase shut off in advance so as to prevent overvoltage instead of switching the control after overvoltage is determined, thereby enabling a DC power supply device and an inverter to be protected.

According to one embodiment of the present invention, there is provided a motor drive device to be mounted on a vehicle including an engine and a motor directly coupled to each other, the vehicle comprising a DC power supply device that is configured to supply electric power to the motor, and is charged by output of the motor, the motor drive device comprising: an inverter configured to convert DC electric power supplied from the DC power supply device into AC electric power, and to convert AC electric power obtained from the motor to DC electric power; and a control device configured to control the inverter, the control device comprising: a failure determination unit configured to determine whether at least one of the inverter or the DC power supply device has a failure, to thereby determine whether or not current is inhibited from flowing from the motor to the DC power supply device; a DC power supply state determination unit configured to determine whether or not the DC power supply device is fully charged, to thereby determine whether or not current is inhibited from flowing from the motor to the DC power supply device; and a switching unit configured to, when one of the failure determination unit and the DC power supply state determination unit determines that the current is inhibited from flowing from the motor to the DC power supply device, select a control to be performed in the inverter from all-phase shut off and three-phase short circuit based on one of a motor rotation speed of the motor, and an induced voltage of the motor and a DC link voltage of the motor.

According to the motor drive device of the present invention, the control to be performed in the inverter is switched between the all-phase shut off and the three-phase short circuit based on a motor rotation speed or a induced voltage of the motor when it is determined that at least one of the inverter or the DC power supply device has a failure, and current is inhibited from flowing from the motor to the DC power supply device. Thus, the control can be switched between the three-phase short circuit and the all-phase shut off in advance so as to prevent overvoltage instead of switching the control after overvoltage is determined, with the result that the DC power supply device and the inverter can be protected.

DETAILED DESCRIPTION OF THE PREFERRED EMBODIMENTS

Figure 1:
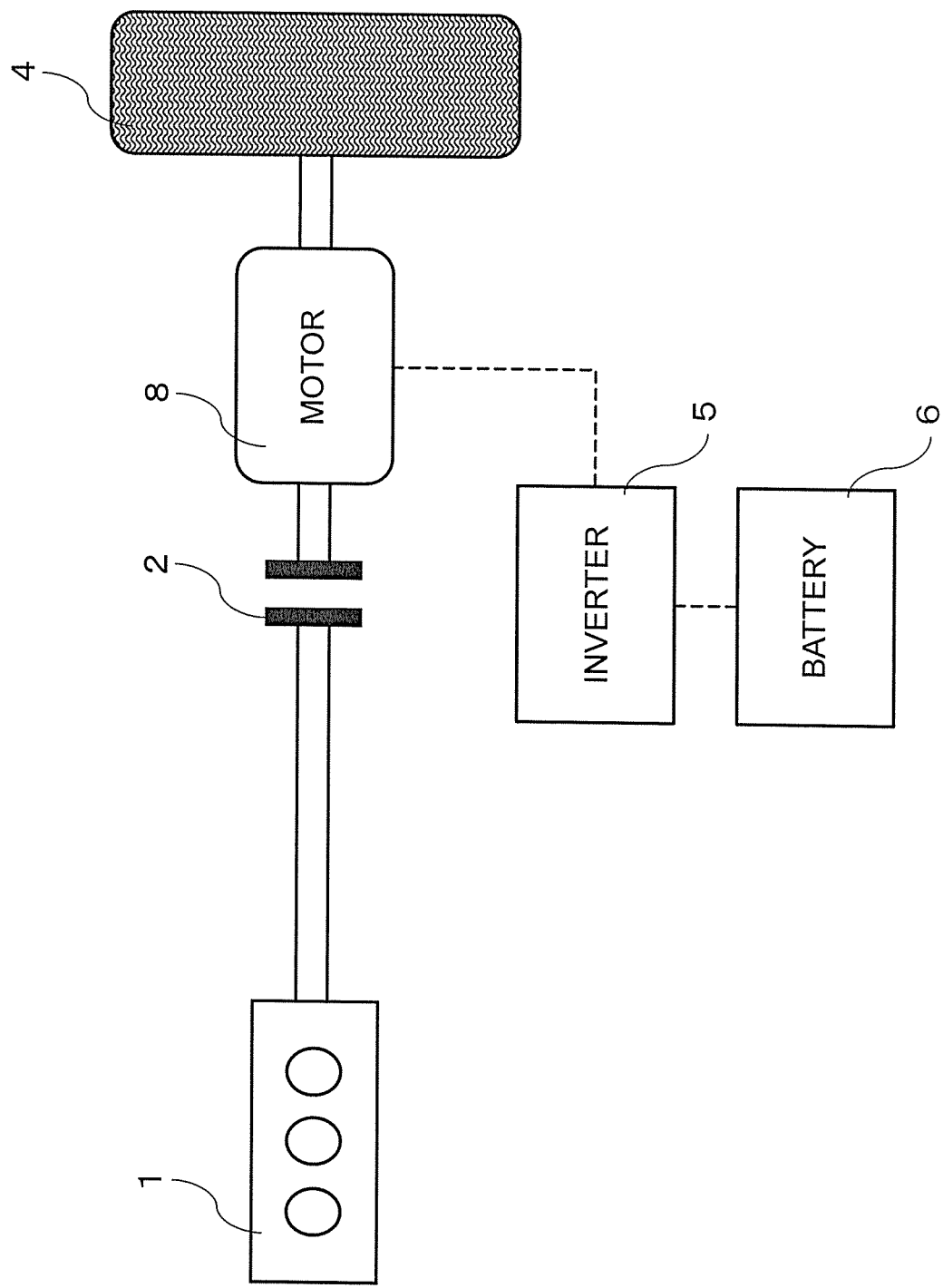
FIG. 1 is a schematic configuration diagram of a vehicle according to a first embodiment, a second embodiment, and a third embodiment of the present invention.

Referring to the accompanying drawings, a motor drive device of a vehicle according to exemplary embodiments of the present invention is now described. Like or corresponding parts in the drawings are denoted by like reference symbols for description.

Prior to the description of a motor drive device according to each of embodiments of the present invention, the configuration of a motor that is driven by the motor drive device, and the configuration of a vehicle on which the motor is mounted are described. The configuration of the motor and the configuration of the vehicle to be described herein are common throughout the embodiments.

FIG. 1 is a schematic configuration diagram of a vehicle according to each of the embodiments of the present invention. In FIG. 1, a power generator (not shown) is driven by an engine 1. The power generator generates power through the drive, and the generated electric power is charged to a battery 6 via an inverter 5.

Then, the inverter 5 converts the electric power generated by the power generator, or the DC electric power stored in the battery 6 into AC electric power and then supplies the AC electric power to the motor 8, to thereby drive the motor 8. In this way, a tire 4 is driven via the motor 8 to run the vehicle.

At the time of deceleration of the vehicle or the like, the motor 8 is rotated by the tire 4 so that the motor 8 performs power regeneration, and the battery 6 is charged with the electric power generated by the motor 8 via the inverter 5.

In addition, the inverter 5 converts the DC electric power stored in the battery 6 into AC electric power to drive the generator, to thereby start the engine 1.

The vehicle can also be run by coupling a clutch 2 disposed between the engine 1 and the motor 8 to transmit driving power of the engine 1 to the tire 4 via the motor 8.

In each of the embodiments to be described later, a series hybrid vehicle as described above is exemplified, but the present invention is not limited thereto and a parallel hybrid vehicle may be used. The series hybrid vehicle is a hybrid vehicle configured to, as described above, store electric power generated with power of an engine in a battery, and rotate a motor with the electricity of the battery, to thereby drive the tire 4. As described above, the series hybrid vehicle travels without using the engine, and may thus be regarded as a type of electric vehicle in power based classification. On the other hand, the parallel hybrid vehicle is a hybrid vehicle configured to drive tires with two types of power of a motor and an engine.

As described above, the generator and the motor 8 may be a motor-generator having both the functions of driving and power generation.

In each of the following embodiments, description is given of a vehicle including a single battery and a single inverter, but the vehicle may include a plurality of batteries of different voltages, and DC/DC converters or the like for voltage conversion may be provided between the generator and the inverter or between the battery and the inverter.

Figure 2:
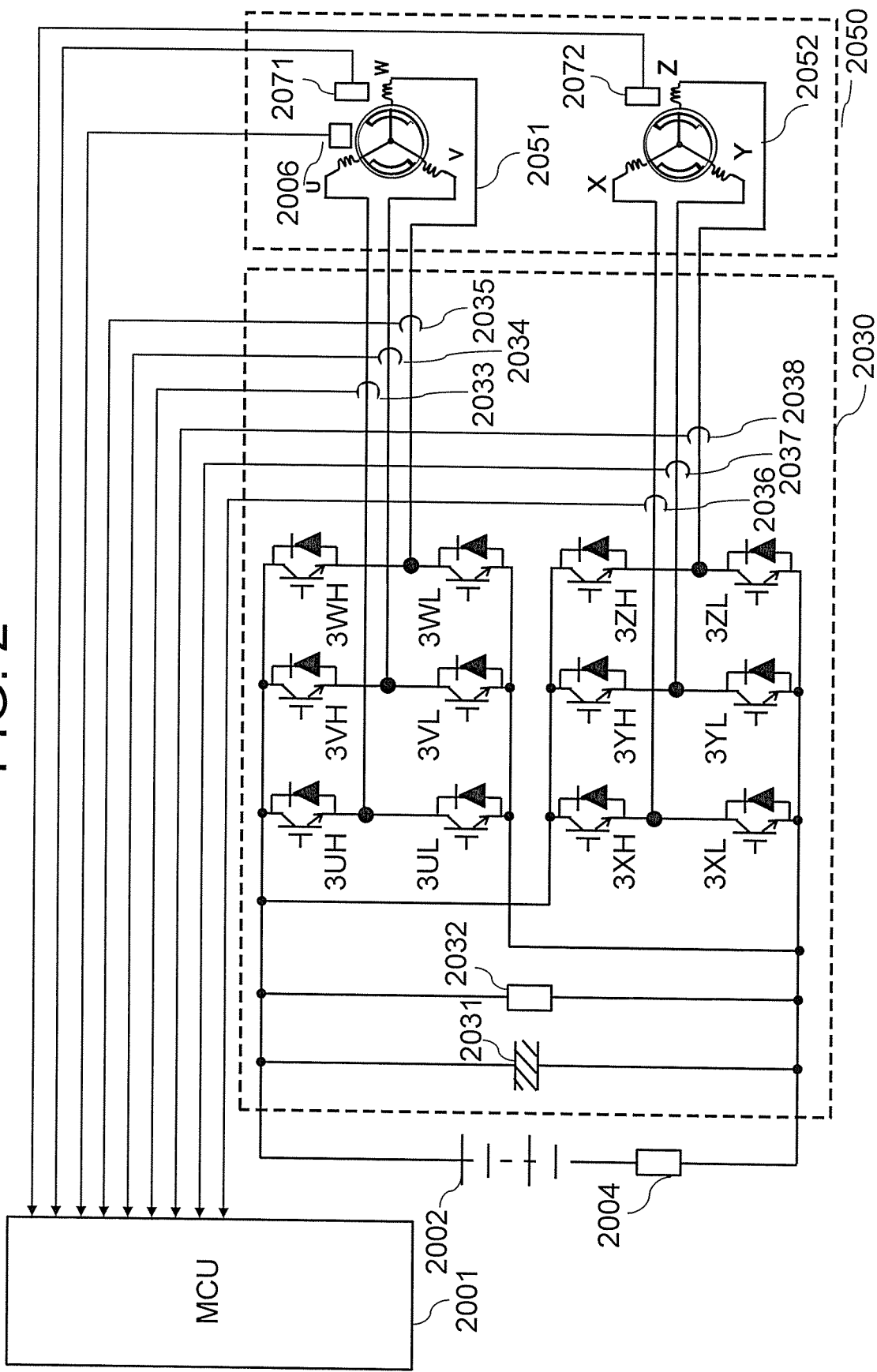
FIG. 2 is a representative schematic configuration diagram of a motor drive device according to the first embodiment, the second embodiment, and the third embodiment of the present invention.

FIG. 2 is a schematic configuration diagram of the motor drive device according to each of the embodiments of the present invention. In FIG. 2, as the motor drive device, a motor-inverter system including a control device for an AC rotary machine is exemplified.

In FIG. 2, a double three-phase motor 2050 includes a first winding group (first group) 2051 having three phases of a U phase, a V phase, and W phase, and a second winding group (second group) 2052 having three phases of an X phase, a Y phase, and a Z phase. The first winding group 2051 and the second winding group 2052 can be individually controlled. The double three-phase motor 2050 corresponds to the motor 8 of FIG. 1. Further, the double three-phase motor 2050 is provided with a U-phase current sensor 2033, a V-phase current sensor 2034, a W-phase current sensor 2035, an X-phase current sensor 2036, a Y-phase current sensor 2037, and a Z-phase current sensor 2038 in order to measure current values in respective phases.

In addition, the double three-phase motor 2050 is provided with a rotation angle sensor 2006, a first coil temperature sensor 2071, and a second coil temperature sensor 2072. The rotation angle sensor 2006 measures a motor rotation angle or a motor rotation speed of the first winding group 2051 and the second winding group 2052. Further, the first coil temperature sensor 2071 measures a motor temperature of the first winding group 2051. Similarly, the second coil temperature sensor 2072 measures a motor temperature of the second winding group 2052. A double three-phase inverter 2030 is connected to the double three-phase motor 2050.

The double three-phase inverter 2030 includes two sets of 6 arm switching elements: upper-arm switching elements 3UH, 3VH, 3WH, 3XH, 3YH, and 3ZH, and lower-arm switching elements 3UL, 3VL, 3WL, 3XL, 3YL, and 3ZL. The arm switching elements 3UH, 3UL, 3VH, 3VL, 3WH, and 3WL are for the first winding group 2051, and the arm switching elements 3XH, 3XL, 3YH, 3YL, 3ZH, and 3ZL are for the second winding group 2052. In the following, those switching elements may be collectively referred to simply as switching elements 3. Each of the switching elements 3 includes a switching element, e.g., an IGBT or a FET, and a feedback diode. The double three-phase inverter 2030 corresponds to the inverter 5 of FIG. 1. A battery (DC power supply device) 2002 is connected to the double three-phase inverter 2030.

The double three-phase inverter 2030 turns on and off each of the switching elements 3 to convert DC electric power obtained from the battery 2002 into AC electric power and to convert AC electric power obtained from the double three-phase motor 2050 into DC electric power. The battery 2002 corresponds to the battery 6 of FIG. 1.

The battery 2002 is provided with a smoothing capacitor 2031, a voltage sensor 2032, and a current sensor 2004. The smoothing capacitor 2031 smooths a DC voltage of the battery 2002. The voltage sensor 2032 measures a DC link voltage of the battery 2002. The current sensor 2004 measures a current flowing to the battery 2002.

Repeatedly turning on and off each of the switching elements 3 is herein referred to as performing pulse width modulation (PWM) control.

In each of the embodiments to be described later, the double three-phase motor 2050 including two groups each having three phases is described. However, the present invention is not limited thereto, and a motor may have four phases or more, or may include three groups or more.

An MCU (control device) 2001 controls current based on current values in respective phases that are detected by the U-phase current sensor 2033, the V-phase current sensor 2034, the W-phase current sensor 2035, the X-phase current sensor 2036, the Y-phase current sensor 2037, and the Z-phase current sensor 2038. The MCU 2001 controls current so that desired torque may be generated at the double three-phase motor 2050.

In the following, the motor drive device according to each of the embodiments of the present invention is described. In each of the embodiments described below, the motor drive device configured to drive the motor illustrated in FIG. 1 and FIG. 2 is exemplified. The motor drive device includes the MCU 2001 and the double three-phase inverter 2030.

First Embodiment

Figure 3:
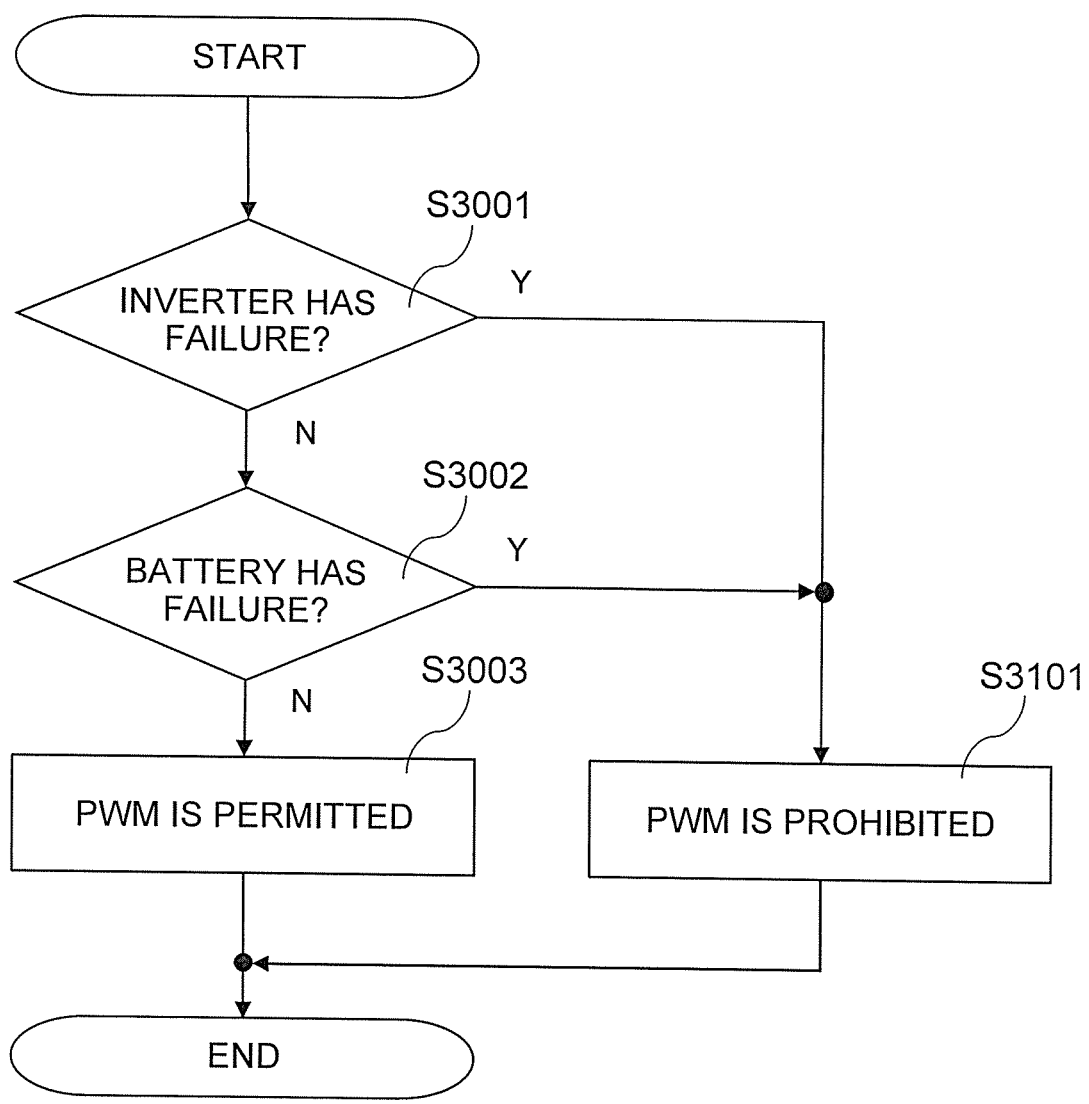
FIG. 3 is a flow chart of processing of determining whether to permit or prohibit PWM of the motor drive device according to the first embodiment of the present invention.

FIG. 3 is a flow chart of processing of determining whether to permit or prohibit the PWM control in the motor drive device according to the first embodiment of the present invention. That is, the MCU 2001 determines, in accordance with the processing flow of FIG. 3, whether or not to allow the double three-phase inverter 2030 to perform the PWM control. The MCU 2001 includes a memory (not shown), and has a PWM permission/prohibition flag stored in the memory. The MCU 2001 sets the PWM permission/prohibition flag stored in the memory to "permission" or "prohibition" based on a result of determination made in the flow of FIG. 3. The processing flow of FIG. 3 is performed by a failure determination unit (not shown) provided in the MCU 2001. The processing is described in detail below.

First, in Step S3001, the MCU 2001 determines whether the double three-phase inverter 2030 has a failure. As the failure of the double three-phase inverter 2030, for example, the following are conceivable: a failure of the current sensor 2004, a failure of the voltage sensor 2032, a failure of any one of the switching elements 3, and a failure of a temperature sensor (not shown) configured to measure a temperature of each of the switching elements 3.

When determining in Step S3001 that the double three-phase inverter 2030 has a failure, the MCU 2001 proceeds to Step S3101 to set the PWM permission/prohibition flag to "prohibition", and then ends the processing flow of FIG. 3.

On the other hand, when determining in Step S3001 that the double three-phase inverter 2030 does not have a failure, the MCU 2001 proceeds to Step S3002.

In Step S3002, the MCU 2001 determines whether the battery 2002 has a failure. When determining that the battery 2002 has a failure, the MCU 2001 proceeds to Step S3101 to set the PWM permission/prohibition flag to "prohibition", and then ends the processing flow of FIG. 3. When determining that the battery 2002 does not have a failure, the MCU 2001 proceeds to Step S3003. Further, in Step S3002, the MCU 2001 also determines whether the battery 2002 is fully charged and the double three-phase inverter 2030 is performing the PWM control for power generation. When the determination is positive, the MCU 2001 proceeds to Step S3101 to set the PWM permission/prohibition flag to "prohibition", and then ends the processing flow of FIG. 3. When the determination is negative, the MCU 2001 proceeds to Step S3003. Further, in Step S3002, the MCU 2001 also determines whether a power supply switch or a connector (not shown) provided between the battery 2002 and the double three-phase inverter 2030 has a failure. When determining that anyone of the power supply switch and the connector has a failure, the MCU 2001 proceeds to Step S3101 to set the PWM permission/prohibition flag to "prohibition", and then ends the processing flow of FIG. 3. When determining that none of the power supply switch and the connector has a failure, the MCU 2001 proceeds to Step S3003.

In Step S3003, the MCU 2001 sets the PWM permission/prohibition flag to "permission", and then ends the processing flow of FIG. 3.

Figure 4:
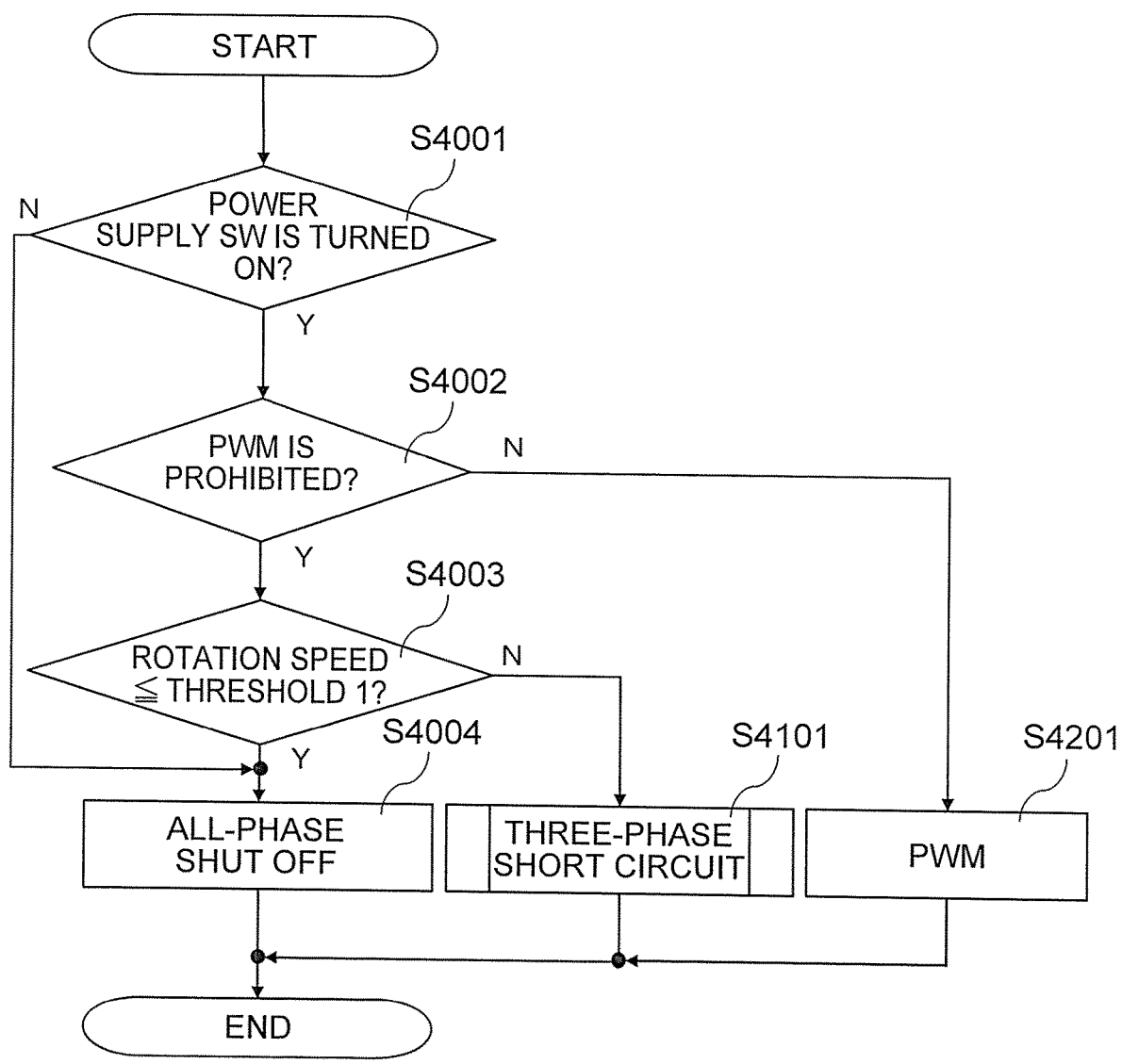
FIG. 4 is a flow chart of processing of determining switching between three-phase short circuit and all-phase shut off based on a motor rotation speed of the motor drive device according to the first embodiment of the present invention.

FIG. 4 is a flow chart of processing of the MCU 2001 of switching among the all-phase shut off, the three-phase short circuit, and the PWM control based on respective conditions, and performing the switched-to control in the motor drive device according to the first embodiment of the present invention. The processing flow of FIG. 4 is performed after the flow of FIG. 3 is performed. The processing flow of FIG. 4 is performed by a switching unit (not shown) provided in the MCU 2001.

Here, the all-phase shut off means that all of the switching elements 3 of the double three-phase inverter 2030 are opened (turned off).

Further, the three-phase short circuit means that the upper-arm switching elements 3 of the double three-phase inverter 2030 are opened (turned off), and at the same time, the lower-arm switching elements 3 are closed (turned on) to establish a phase short-circuit state so that short-circuit current flows through the double three-phase motor 2050.

The processing is described in detail below.

First, in Step S4001, the MCU 2001 determines whether the power supply switch (not shown) provided between the battery 2002 and the double three-phase inverter 2030 is turned on. When the power supply switch is turned off, the MCU 2001 proceeds to Step S4004.

In Step S4004, the MCU 2001 performs the all-phase shut off, namely, opens (turns off) all of the switching elements 3 of the double three-phase inverter 2030, and then ends the processing flow of FIG. 4.

On the other hand, when determining in Step S4001 that the power supply switch (not shown) provided between the battery 2002 and the double three-phase inverter 2030 is turned on, the MCU 2001 proceeds to Step S4002.

In Step S4002, the MCU 2001 determines whether the PWM permission/prohibition flag stored in the memory has been set to "prohibition" in the permission/prohibition determination processing of the PWM of FIG. 3. When the flag is not set to "prohibition", the MCU 2001 proceeds to Step S4201 to perform the normal PWM processing, thereby performing power running or power generation by the double three-phase motor 2050, and then ends the processing flow of FIG. 4.

On the other hand, when determining in Step S4002 that the flag is set to "prohibition", the MCU 2001 proceeds to Step S4003.

In Step S4003, the MCU 2001 determines whether a motor rotation speed is equal to or less that the threshold 1 set in advance. When the motor rotation speed is equal to or less than the threshold 1, the MCU 2001 proceeds to Step S4004.

In Step S4004, the MCU 2001 performs the all-phase shut off, namely, opens (turns off) all of the switching elements 3 of the double three-phase inverter 2030, and then ends the processing flow of FIG. 4.

On the other hand, when determining in Step S4003 that the motor rotation speed is not equal to or less than the threshold 1, the MCU 2001 proceeds to Step S4101.

In Step S4101, the MCU 2001 performs the three-phase short circuit, namely, opens (turns off) the upper-arm switching elements 3 of the double three-phase inverter 2030, and at the same time, closes (turns on) the lower-arm switching elements 3, and then ends the processing flow of FIG. 4.

The above-mentioned threshold 1 is appropriately set in advance based on the characteristics of the double three-phase motor 2050 and experimental results. For example, the threshold 1 is set to be equal to or less than a rotation speed in a range in which an induced voltage of the double three-phase motor 2050 that is generated during rotation of the double three-phase motor 2050 does not exceed a DC link voltage of the battery 2002.

With the threshold 1 set as described above, even in the all-phase shut off state in which all of the switching elements 3 of the double three-phase inverter 2030 are opened, an induced voltage of the double three-phase motor 2050 does not exceed a DC link voltage of the battery 2002. Thus, a large current can be prevented from flowing from the double three-phase motor 2050 to the battery 2002 through the feedback diode of each of the switching elements 3, and the battery 2002 and the double three-phase inverter 2030 are therefore not damaged.

Further, the threshold 1 may be a map value that is set for each of a plurality of DC link voltages through experiment conducted for each voltage. Specifically, through experiment, for each of the DC link voltages, there is obtained a rotation speed in a range in which an induced voltage of the double three-phase motor 2050 that is generated during rotation of the double three-phase motor 2050 does not exceed a DC link voltage of the battery 2002, to thereby prepare a map in which the rotation speed is set as the threshold 1 in advance for each of the DC link voltages. The threshold 1 may be obtained from the map based on a value of the DC link voltage. At this time, a voltage value measured by the voltage sensor 2032 is used as the DC link voltage.

Further, when it is known through experiment that such overvoltage may be generated that damages the battery 2002 and the double three-phase inverter 2030 when the control is switched among the three-phase short circuit, the all-phase shut off, and the PWM, the threshold 1 may be set to a value with which overvoltage is not generated.

Figure 8:
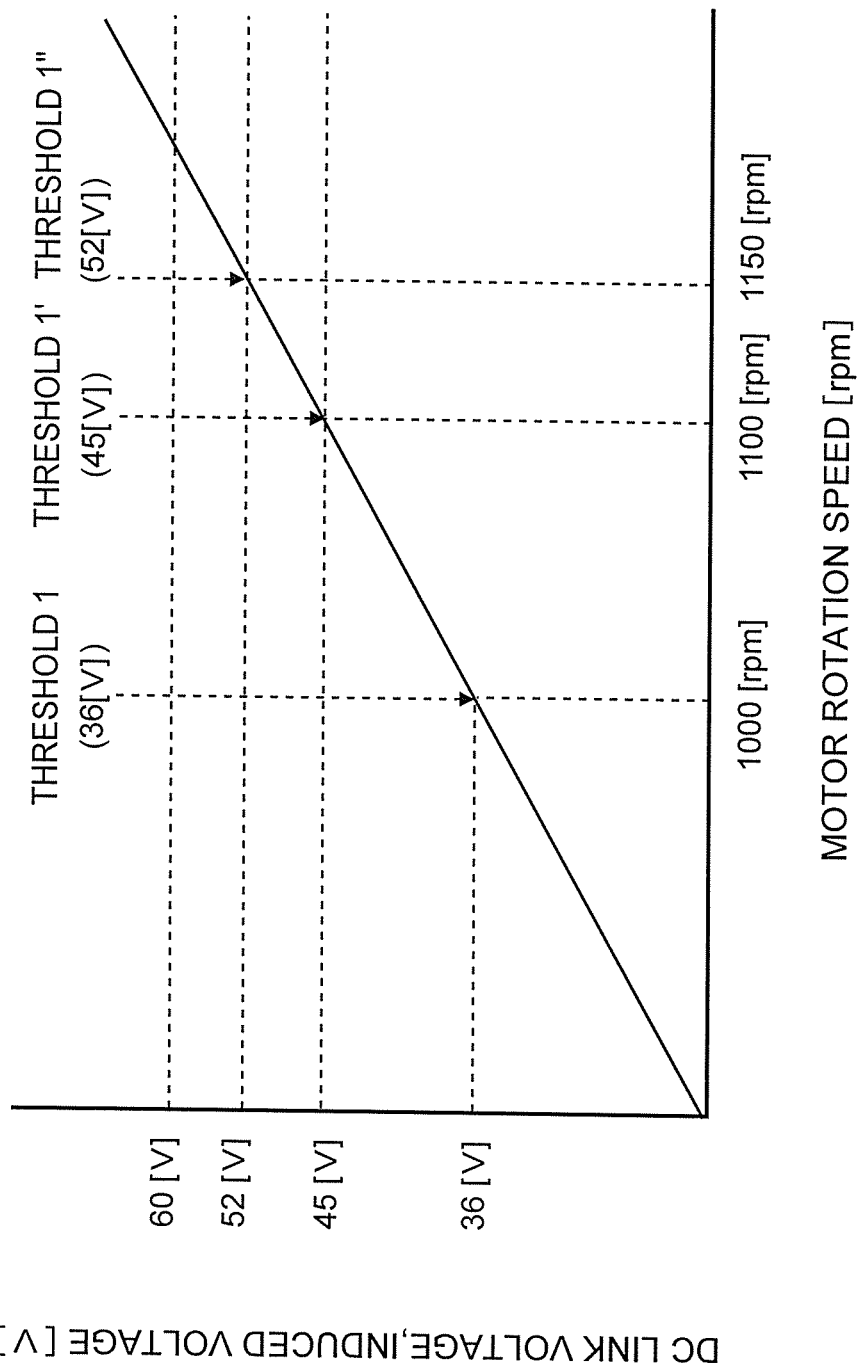
FIG. 8 is an explanatory diagram for showing a method of setting a threshold 1 for switching between the three-phase short circuit and the all-phase shut off in the motor drive device according to the first embodiment of the present invention.

The setting of the threshold 1 is described with reference to FIG. 8, for example. In FIG. 8, the horizontal axis represents the motor rotation speed, and the vertical axis represents the DC link voltage. As shown in FIG. 8, when the DC link voltage is 36 [V], the threshold 1 is set to a value equal to or less than 1,000 [rpm]. When the DC link voltage is 45 [V], the threshold 1' is set to a value equal to or less than 1,100 [rpm] as the threshold 1. When the DC link voltage is 52 [V], the threshold 1" is set to a value equal to or less than 1,150 [rpm] as the threshold 1.

Further, in this embodiment, when a motor rotation speed is more than the threshold 1, and an induced voltage of the double three-phase motor 2050 has exceeded or may exceed a DC link voltage of the battery 2002, the three-phase short-circuit state is established to cause short-circuit current to flow through the double three-phase motor 2050 so that current can be prevented from flowing through the battery 2002. The battery 2002 and the double three-phase inverter 2030 are therefore not damaged.

Further, in this embodiment, as described above, the control is switched to the three-phase short circuit or the all-phase shut off in advance so as to prevent overvoltage, instead of switching to the three-phase short circuit or the all-phase shut off after overvoltage is determined. Thus, such a situation is avoided that switching to the three-phase short circuit or the all-phase shut off is made too late, and hence the battery 2002 and the double three-phase inverter 2030 are damaged due to overvoltage. Further, processing of determining overvoltage is not necessary, with the result that there can be achieved a motor drive device in which complication of the processing and an increase in cost are prevented.

Figure 7:
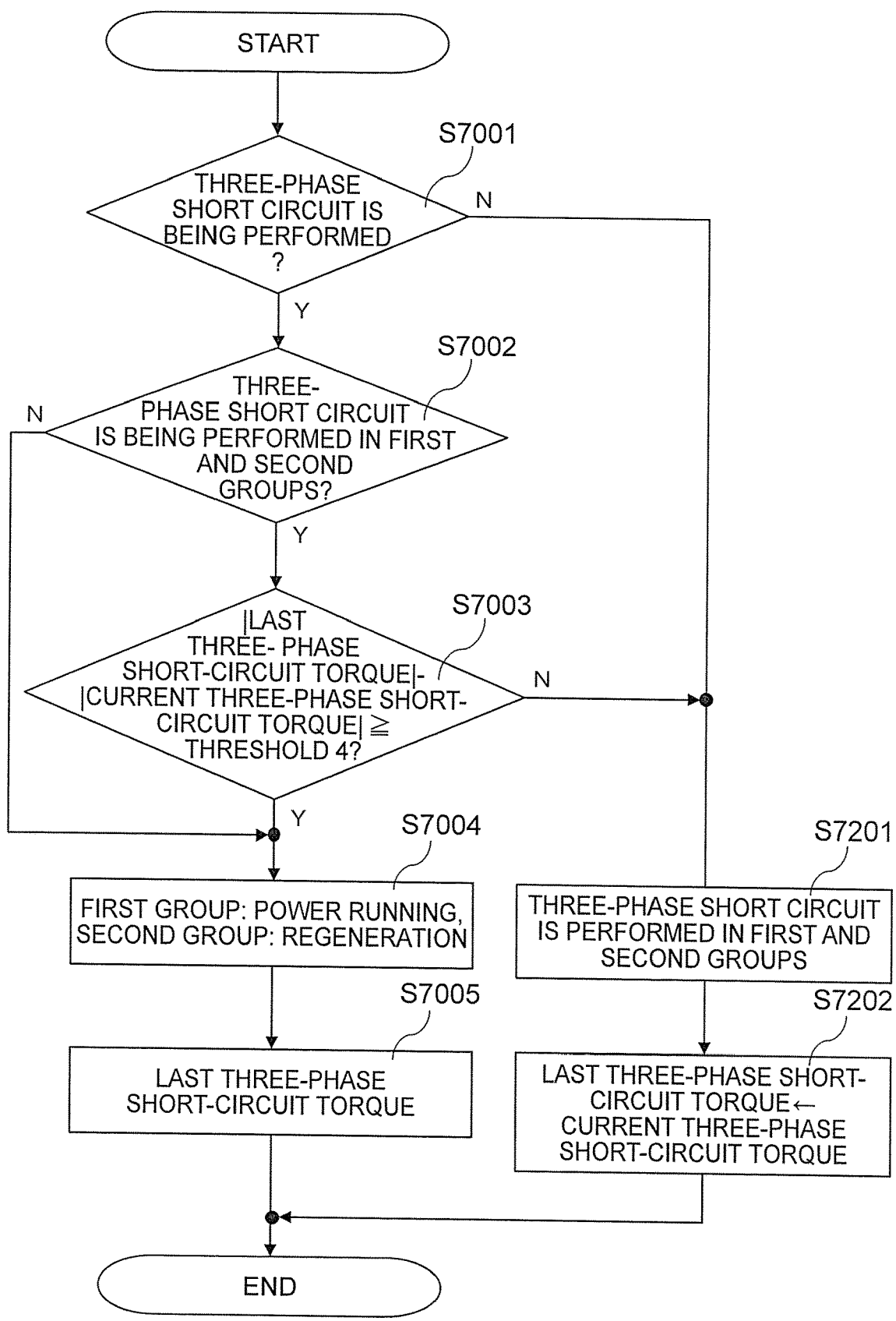
FIG. 7 is a flow chart of three-phase short-circuit processing of the motor drive device according to the first embodiment of the present invention.

FIG. 7 is a flow chart of three-phase short-circuit processing in the motor drive device according to the first embodiment of the present invention. The processing flow of FIG. 7 is performed by a three-phase short-circuit processing unit (not shown) provided in the MCU 2001.

In FIG. 7, first, the MCU 2001 determines in Step S7001 that the three-phase short circuit is currently being performed in the double three-phase inverter 2030. When the three-phase short circuit is being performed, the MCU 2001 proceeds to Step S7002. When the three-phase short circuit is not being performed, the MCU 2001 proceeds to Step S7201.

In Step S7201, the MCU 2001 controls the double three-phase inverter 2030 to perform the three-phase short circuit in both of the first winding group 2051 and the second winding group 2052. In addition, in Step S7202, the MCU 2001 stores, in the memory, current three-phase short-circuit torque generated as a result of performing the three-phase short circuit as a value of last three-phase short-circuit torque, and then ends the processing flow of FIG. 7. Three-phase short-circuit torque is measured by a torque sensor (not shown) provided to each of the first winding group 2051 and the second winding group 2052. Alternatively, as three-phase short-circuit torque, there may be used estimated torque calculated from current values measured by current sensors in place of using the torque sensors. Still alternatively, as three-phase short-circuit torque, there may be used estimated torque calculated from voltage command values of the PWM or actual voltages in place of using the torque sensors.

In Step S7002, the MCU 2001 determines whether the three-phase short circuit is being performed in both of the first winding group 2051 and the second winding group 2052 of the double three-phase inverter 2030. When the three-phase short circuit is being performed in both of the first winding group 2051 and the second winding group 2052, the MCU 2001 proceeds to Step S7003. When the three-phase short circuit is being performed in none of the first winding group 2051 and the second winding group 2052, the MCU 2001 proceeds to Step S7004.

In Step S7003, the MCU 2001 compares a threshold 4 set in advance and a difference between an absolute value of last three-phase short-circuit torque and an absolute value of current three-phase short-circuit torque to each other. When the difference is equal to or more than the threshold 4, that is, when a reduction amount of the three-phase short-circuit torque is equal to or more than the threshold 4, the MCU 2001 proceeds to Step S7004, whereas when the difference is less than the threshold 4, the MCU 2001 proceeds to Step S7201. The threshold 4 is appropriately set in advance based on the characteristics of the double three-phase motor 2050 and experimental results. For example, the threshold 4 is set to be equal to or less than a reduction amount of braking torque in a range in which DC current balance can be zero.

In Step S7004, the MCU 2001 controls the double three-phase inverter 2030 so that the first winding group 2051 of the double three-phase inverter 2030 may perform power running and the second winding group 2052 may perform regeneration. With this, when it is determined that braking torque is reduced while the three-phase short circuit is performed, the MCU 2001 can perform the control so that the DC current balance can become zero. At this time, a similar effect can be obtained even when, in a manner reverse to the above, namely, the control is made so that the first winding group 2051 may perform regeneration and the second winding group 2052 may perform power running.

Next, in Step S7005, the MCU 2001 stores 0 [Nm] to the last three-phase short-circuit torque stored in the memory, and then ends the processing flow of FIG. 7.

As described above, in this embodiment, when it is determined that the double three-phase inverter 2030 has a failure, or the battery 2002 has a failure or is fully charged (or is almost fully charged), and current is inhibited from flowing from the double three-phase motor 2050 to the battery 2002 side, the three-phase short circuit or the all-phase shut off is performed in the double three-phase inverter 2030 while the PWM control is prohibited. Further, in a case where a motor rotation speed of the double three-phase motor 2050 when the control is switched to the three-phase short circuit or the all-phase shut off is more than the threshold 1, that is, when an induced voltage of the double three-phase motor 2050 has exceeded or may exceed a DC link voltage of the battery 2002, it is determined that current may flow to the battery 2002 side even if the all-phase shut off is performed, and switching is made to establish the three-phase short-circuit state, thereby causing short-circuit current to flow through the double three-phase motor 2050. Consequently, without any additional special device, current can be prevented from flowing from the double three-phase motor 2050 to the battery 2002 side even when the double three-phase motor 2050 regenerates power with induced voltages, and the battery 2002 and the double three-phase inverter 2030 are therefore not damaged. As a result, the battery 2002 and the double three-phase inverter 2030 can be protected.

Further, in this embodiment, the threshold 1 is switched depending on the DC link voltage when the switching is made, which can suppress generation of braking torque due to the three-phase short circuit in a region in which the DC link voltage is high and the motor rotation speed is low.

Further, in this embodiment, the control is switched to the three-phase short circuit or the all-phase shut off in advance so as to prevent overvoltage, instead of switching to the three-phase short circuit or the all-phase shut off after overvoltage is detected. Thus, such a situation is avoided that switching to the three-phase short circuit or the all-phase shut off is made too late, and hence the battery 2002 and the double three-phase inverter 2030 are damaged due to overvoltage. Further, the processing of determining overvoltage is not necessary, with the result that there can be achieved a motor drive device in which complication of the processing and an increase in cost are prevented.

In addition, in this embodiment, when a reduction amount of the three-phase short-circuit torque is equal to or more than the threshold 4 while the double three-phase inverter 2030 is performing the three-phase short circuit, one of the first group and the second group performs power running, and the other thereof performs regeneration. Thus, the control can be made so that the DC current balance can become zero when braking torque is reduced while the three-phase short circuit is performed.

Second Embodiment

Figure 5:
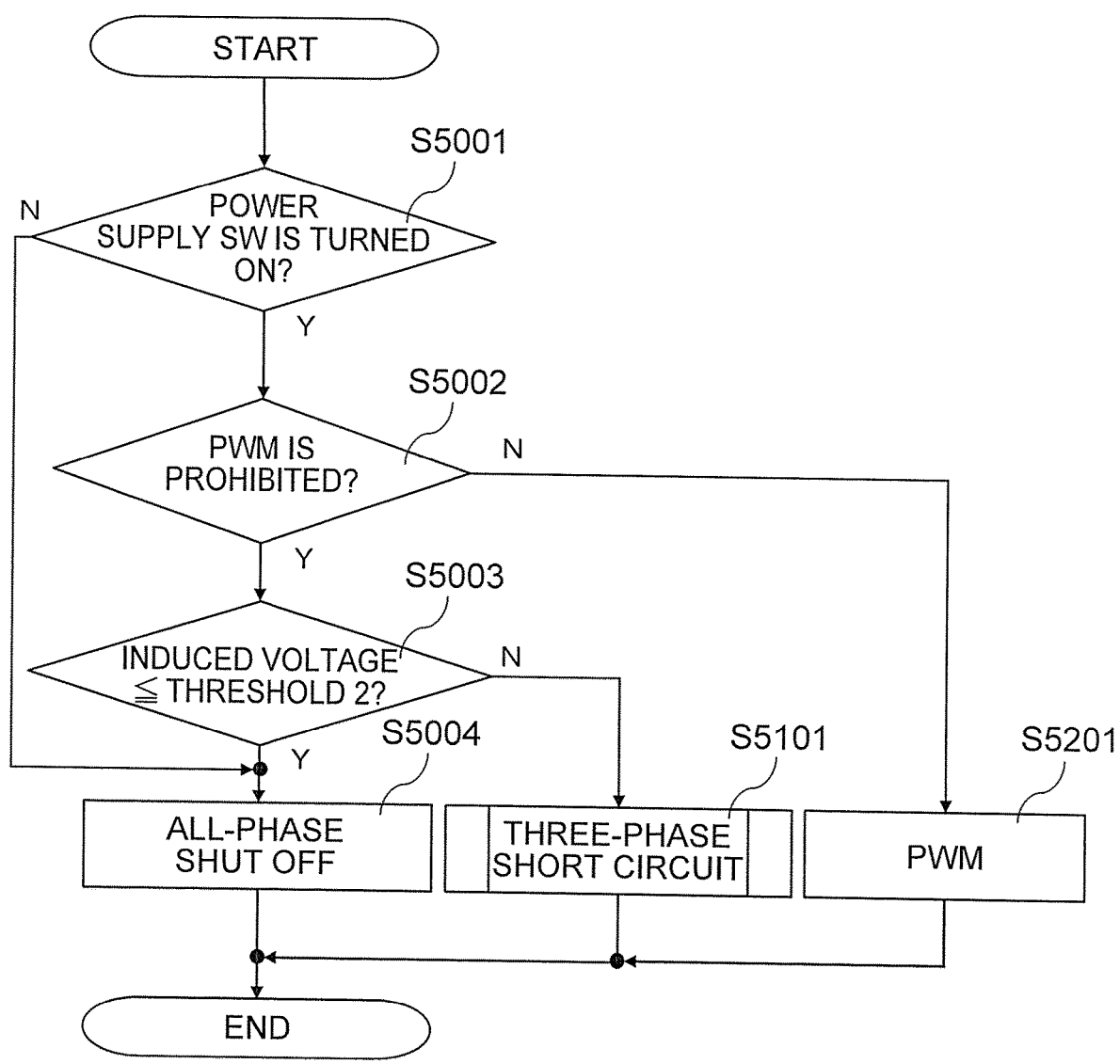
FIG. 5 is a flow chart of processing of determining switching between the three-phase short circuit and the all-phase shut off based on an induced voltage of the motor drive device according to the second embodiment of the present invention.

FIG. 5 is a flow chart of processing of switching among the all-phase shut off, the three-phase short circuit, and the PWM based on respective conditions, and performing the switched-to control in a motor drive device according to a second embodiment of the present invention. The processing flow of FIG. 5 is performed by a switching unit (not shown) provided in the MCU 2001. The remaining configuration and operation are the same as those of the first embodiment.

In FIG. 5, Steps S5001, S5002, S5004, S5101, and S5201 are the same as Steps S4001, S4002, S4004, S4101, and S4201 of FIG. 4, respectively, and hence the description thereof is herein omitted.

In this embodiment, in Step S5003, the MCU 2001 determines whether an induced voltage of the double three-phase motor 2050 is equal to or less than a threshold 2 set in advance. When the induced voltage is not equal to or less than the threshold 2, the MCU 2001 proceeds to Step S5101 to perform processing for the three-phase short circuit, and then ends the processing flow of FIG. 5. When the induced voltage is equal to or less than the threshold 2, the MCU 2001 proceeds to Step S5004 to perform processing for the all-phase shut off, and then ends the processing flow of FIG. 5.

The above-mentioned threshold 2 is appropriately set in advance based on the characteristics of the double three-phase motor 2050 and experimental results. For example, the threshold 2 is set to a value with which an induced voltage of the double three-phase motor 2050 that is generated during rotation of the double three-phase motor 2050 does not exceed a DC link voltage of the battery 2002. With the threshold 2 set as described above, even in the all-phase shut off state in which all of the switching elements 3 of the double three-phase inverter 2030 are opened, an induced voltage of the double three-phase motor 2050 does not exceed a DC link voltage. Thus, a large current can be prevented from flowing from the double three-phase motor 2050 to the battery 2002 through the feedback diode of each of the switching elements 3, and the battery 2002 and the double three-phase inverter 2030 are therefore not damaged. Further, the threshold 2 may be a map value that is set for each of a plurality of DC link voltages through experiment conducted for each voltage.

Further, in this embodiment, in a case where an induced voltage of the double three-phase motor 2050 when the control is switched to the three-phase short circuit or the all-phase shut off is more than the threshold 2, that is, when an induced voltage of the double three-phase motor 2050 has exceeded or may exceed a DC link voltage of the battery 2002, switching is made to establish the three-phase short-circuit state, thereby causing short-circuit current to flow through the double three-phase motor 2050. Consequently, current can be prevented from flowing through the battery 2002, and the battery 2002 and the double three-phase inverter 2030 are therefore not damaged.

Further, similarly to the first embodiment, also in this embodiment, the control is switched to the three-phase short circuit or the all-phase shut off in advance so as to prevent overvoltage, instead of switching to the three-phase short circuit or the all-phase shut off after overvoltage is determined. Thus, such a situation is avoided that switching to the three-phase short circuit or the all-phase shut off is made too late, and hence the battery 2002 and the double three-phase inverter 2030 are damaged due to overvoltage. Further, the processing of determining overvoltage is not necessary, with the result that there can be achieved a motor drive device in which complication of the processing and an increase in cost are prevented.

Third Embodiment

Figure 6:
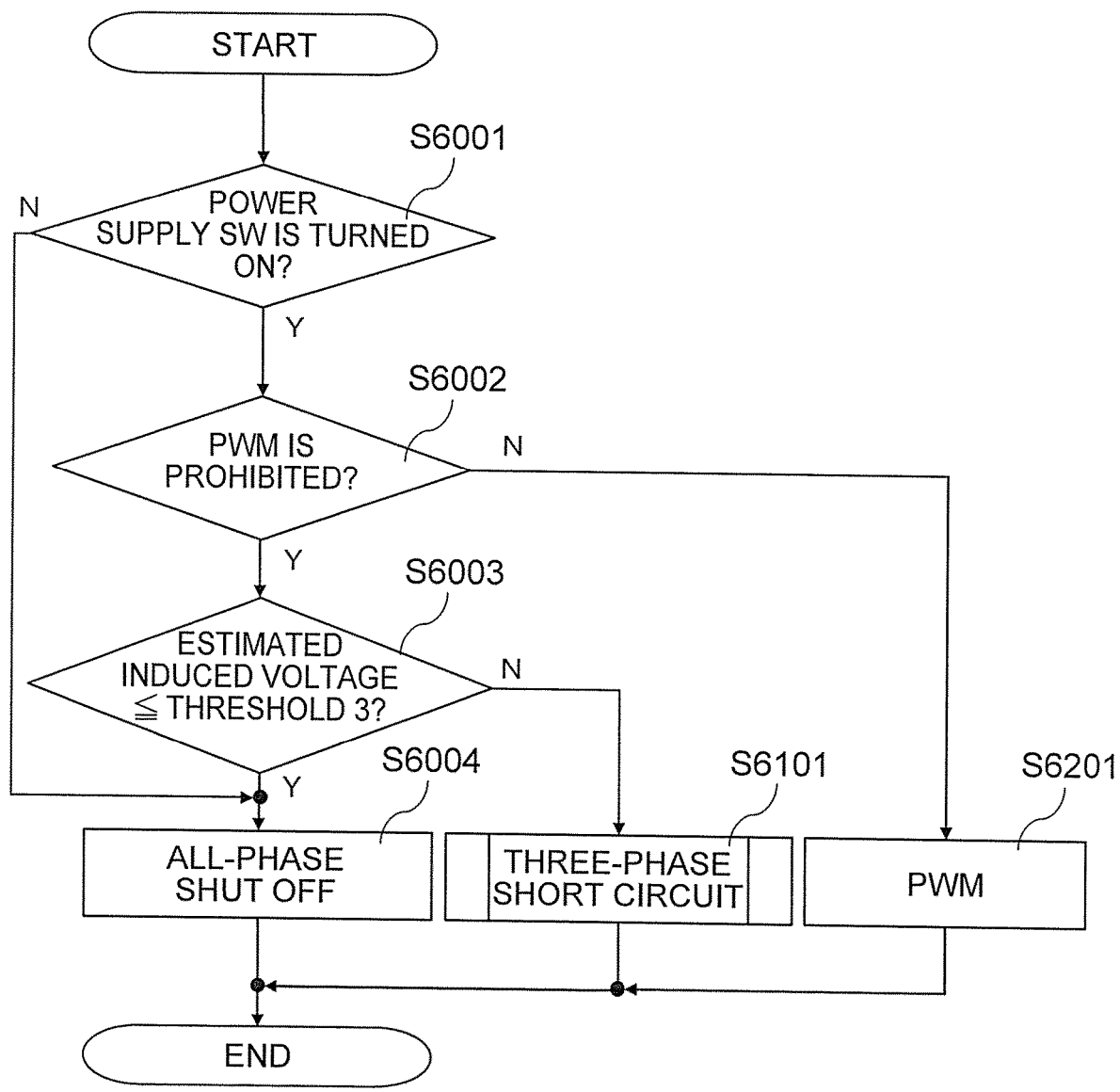
FIG. 6 is a flow chart of processing of determining switching between the three-phase short circuit and the all-phase shut off based on an estimated induced voltage of the motor drive device according to the third embodiment of the present invention.

FIG. 6 is a flow chart of processing of switching to the all-phase shut off, the three-phase short circuit, and the PWM based on respective conditions, and performing the switched-to control in a motor drive device of a vehicle according to a third embodiment of the present invention. The processing flow of FIG. 6 is performed by a switching unit (not shown) provided in the MCU 2001. The remaining configuration and operation are the same as those of the first embodiment or the second embodiment described above.

In FIG. 6, Steps S6001, S6002, S6004, S6101, and S6201 are the same as Steps S4001, S4002, S4004, S4101, and S4201 of FIG. 4, respectively, and hence the description thereof is herein omitted.

In this embodiment, in Step S6003, the MCU 2001 obtains an estimated induced voltage of the double three-phase motor 2050, and determines whether the estimated induced voltage is equal to or less than a threshold 3 set in advance. When the estimated induced voltage is not equal to or less than the threshold 3, the MCU 2001 proceeds to Step S6101 to perform processing for the three-phase short circuit, and then ends the processing flow of FIG. 6. When the estimated induced voltage is equal to or less than the threshold 3, the MCU 2001 proceeds to Step S6004 to perform processing for the all-phase shut off, and then ends the processing flow of FIG. 6.

An estimated induced voltage of the double three-phase motor 2050 is obtained by the following method, for example. First, a value of an induced voltage of the double three-phase motor 2050 is obtained for each motor rotation speed and for each motor temperature based on the characteristics of the double three-phase motor 2050 and experimental results. Then, there is generated a three-dimensional map in which the value of the induced voltage of the double three-phase motor 2050 is defined for each motor rotation speed and for each motor temperature. The map is stored in the memory of the MCU 2001 in advance. The MCU 2001 refers to the map based on motor rotation speed and motor temperature when the control is switched to the all-phase shut off, the three-phase short circuit, and the PWM, and obtains an estimated induced voltage of the double three-phase motor 2050 from the map.

The map is not limited to the three-dimensional map described above, and a two-dimensional map in which a value of an induced voltage of the double three-phase motor 2050 is defined for each motor rotation speed, or a two-dimensional map in which a value of an induced voltage of the double three-phase motor 2050 is defined for each motor temperature may be used. Further, there may be used a map using other parameters indicating states of the double three-phase motor 2050 than motor rotation speed and motor temperature.

Further, the above-mentioned threshold 3 is appropriately set in advance based on the characteristics of the double three-phase motor 2050 and experimental results. For example, the threshold 3 is set to a value with which an estimated induced voltage of the motor that is generated during rotation of the motor does not exceed a DC link voltage of the battery 2002. With the threshold 3 set as described above, even in the all-phase shut off state in which all of the switching elements 3 of the double three-phase inverter 2030 are opened, an induced voltage of the double three-phase motor 2050 does not exceed a DC link voltage of the battery 2002. Thus, a large current can be prevented from flowing from the double three-phase motor 2050 to the battery 2002 through the feedback diode of each of the switching elements 3, and the battery 2002 and the double three-phase inverter 2030 are therefore not damaged. Further, the threshold 3 may be a map value that is set for each of a plurality of DC link voltages through experiment conducted for each voltage.

Further, in this embodiment, in a case where an estimated induced voltage of the double three-phase motor 2050 when the control is switched to the three-phase short circuit and the all-phase shut off is more than the threshold 3, that is, when an estimated induced voltage of the double three-phase motor 2050 has exceeded or may exceed a DC link voltage of the battery 2002, switching is made to establish the three-phase short-circuit state, thereby causing short-circuit current to flow through the double three-phase motor 2050. Consequently, current can be prevented from flowing through the battery 2002, and the battery 2002 and the double three-phase inverter 2030 are therefore not damaged.

Further, similarly to the first and second embodiments, also in this embodiment, the control is switched to the three-phase short circuit and the all-phase shut off in advance so as to prevent overvoltage, instead of switching to the three-phase short circuit and the all-phase shut off after overvoltage is determined. Thus, such a situation is avoided that switching between the three-phase short circuit and the all-phase shut off is made too late, and hence the DC power supply device and the inverter are damaged due to overvoltage. Further, the processing of determining overvoltage is not necessary, with the result that there can be achieved a motor drive device in which complication of the processing and an increase in cost are prevented. Further, in this embodiment, an induced voltage of the double three-phase motor 2050 is estimated with the use of the map, and hence devices configured to measure induced voltages of the double three-phase motor 2050 are not necessary. Thus, there can be achieved a motor drive device in which an increase in cost is prevented more effectively.

What is claimed is:
1. A motor drive device to be mounted on a vehicle including an engine and a motor directly coupled to each other,
the vehicle comprising a DC power supply device that is configured to supply electric power to the motor, and is charged by output of the motor,
the motor drive device comprising:
an inverter configured to convert DC electric power supplied from the DC power supply device into AC electric power, and to convert AC electric power obtained from, the motor to DC electric power; and a control device configured to control the inverter, the control device comprising:

a DC power supply state determination unit configured to determine whether or not the DC power supply device is fully charged, to thereby determine whether or not current is inhibited from flowing from the motor to the DC power supply device; and a switching unit configured to, in response to the DC power supply state determination unit determining that the current is inhibited from flowing from the motor to the DC power supply device, select a control to be performed in the inverter from all-phase shut off and three-phase short circuit based on one of a motor rotation speed of the motor, and an induced voltage of the motor and a DC link voltage of the DC power supply device, wherein the switching unit is configured to:

perform the all-phase shut off in the inverter when the induced voltage of the motor is equal to or less than the DC link voltage; and perform the three-phase short circuit in the inverter when the induced voltage of the motor is more than the DC link voltage.

2. The motor drive device according to claim 1, wherein the motor and the inverter configured to drive the motor each comprises a first group having a U phase, a V phase, and a W phase, and a second group having an X phase, a Y phase, and a Z phase, and wherein the control device further comprises a three-phase short-circuit processing unit configured to, when a reduction amount of three-phase short-circuit torque is equal to or more than a threshold while the inverter is performing the three-phase short circuit, perform control so that one of the first group and the second group performs power running and another one of the first group and the second group performs regeneration, to thereby achieve an increase or a decrease of direct current to zero.

* * * * *